US006176601B1

(12) United States Patent
Nester

(10) Patent No.: US 6,176,601 B1
(45) Date of Patent: Jan. 23, 2001

(54) LIGHTING SYSTEM FOR A PERSONAL WATERCRAFT

(76) Inventor: Ty Nester, 523 Merrit Ave., Camarillo, CA (US) 93012

( * ) Notice: Under 35 U.S.C. 154(b), the term of this patent shall be extended for 0 days.

(21) Appl. No.: 09/268,533

(22) Filed: Mar. 12, 1999

(51) Int. Cl.[7] .............................. F21V 1/00; B63B 45/04
(52) U.S. Cl. ........................................... 362/477; 362/288
(58) Field of Search ................................... 362/477, 285, 362/288, 287, 427

(56) References Cited

U.S. PATENT DOCUMENTS

| | | | |
|---|---|---|---|
| 4,954,936 | * 9/1990 | Kawabata et al. | 362/249 |
| 5,142,457 | * 8/1992 | Wehner | 362/477 |
| 5,416,670 | 5/1995 | Authier | 362/34 |
| 5,486,987 | * 1/1996 | Fritz, Jr. | 362/226 |
| 5,488,361 | 1/1996 | Perry | 340/984 |
| 5,495,401 | 2/1996 | Evans | 362/477 |
| 5,544,022 | * 8/1996 | Blackard | 362/477 |

* cited by examiner

Primary Examiner—Alan Cariaso
Assistant Examiner—Ronald E. DelGizzi
(74) Attorney, Agent, or Firm—Goldstein & Canino

(57) ABSTRACT

A lighting system for a personal watercraft including a front light portion secured to a peripheral frame portion at a front portion of a personal watercraft. The front light portion is comprised of an elongated rod having a lower end extending through an aperture in the peripheral frame portion. An upper end of the elongated rod has a bulb disposed thereon. The front light portion is in communication with a battery of the personal watercraft. A rear light portion is secured to the peripheral frame portion at a rear portion of the personal watercraft. The rear light portion is comprised of an elongated rod having a lower end extending through an aperture in the peripheral frame portion. An upper end of the elongated rod has a bulb disposed thereon. The rear light portion is in communication with a battery of the personal watercraft.

5 Claims, 2 Drawing Sheets

LIGHTING SYSTEM FOR A PERSONAL WATERCRAFT

BACKGROUND OF THE INVENTION

The present invention relates to a lighting system for a personal watercraft and more particularly pertains to insuring added visibility of the personal watercraft.

The use of navigation lights is known in the prior art. More specifically, navigation lights heretofore devised and utilized for the purpose of enhancing safety are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,416,670 to Authier discloses a navigational light system including a rear white light stick using a chemiluminescent substance. U.S. Pat. No. 5,488,361 to Perry discloses a battery powered lighting system for use on a personal watercraft such as a jet ski that is incorporated into the user's vest and helmet. U.S. Pat. No. 5,495,401 to Evans discloses a lighting system for a boat.

While these devices fulfill their respective, particular objective and requirements, the aforementioned patents do not describe a lighting system for a personal watercraft for insuring added visibility of the personal watercraft.

In this respect, the lighting system for a personal watercraft according to the present invention substantially departs from the conventional concepts and designs of the prior art, and in doing so provides an apparatus primarily developed for the purpose of insuring added visibility of the personal watercraft.

Therefore, it can be appreciated that there exists a continuing need for new and improved lighting system for a personal watercraft which can be used for ensuring added visibility of the personal watercraft. In this regard, the present invention substantially fulfills this need.

SUMMARY OF THE INVENTION

In the view of the foregoing disadvantages inherent in the known types of navigation lights now present in the prior art, the present invention provides an improved lighting system for a personal watercraft. As such, the general purpose of the present invention, which will be described subsequently in greater detail, is to provide a new and improved lighting system for a personal watercraft and method which has all the advantages of the prior art and none of the disadvantages.

To attain this, the present invention essentially comprises a personal watercraft defined by a front portion, a rear portion, and a intermediate portion therebetween. The personal watercraft has a peripheral frame portion extending therearound. A front light portion is secured to the peripheral frame portion at the front portion of the personal watercraft. The front light portion is comprised of an elongated rod having a lower end extending through an aperture in the peripheral frame portion. The lower end has a spring disposed thereon positioned below the peripheral frame portion. The lower end has a fastening nut disposed thereon. The elongated rod has a washer disposed thereon positioned above the peripheral frame portion. An upper end of the elongated rod has a bulb disposed thereon. The front light portion is in communication with a battery of the personal watercraft. A rear light portion is secured to the peripheral frame portion at the rear portion of the personal watercraft. The rear light portion is comprised of an elongated rod having a lower end extending through an aperture in the peripheral frame portion. The lower end has a spring disposed thereon positioned below the peripheral frame portion. The lower end has a fastening nut disposed thereon. The elongated rod has a washer disposed thereon positioned above the peripheral frame portion. An upper end of the elongated rod has a bulb disposed thereon. The rear light portion is in communication with a battery of the personal watercraft. A switch is secured within a control panel of the personal watercraft. The switch is in communication with the front and rear light portions.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lighting system for a personal watercraft which has all the advantages of the prior art navigation lights and none of the disadvantages.

It is another object of the present invention to provide a new and improved lighting system for a personal watercraft which may be easily and efficiently manufactured and marketed.

It is a further object of the present invention to provide a new and improved lighting system for a personal watercraft which is of durable and reliable construction.

An even further object of the present invention is to provide a new and improved lighting system for a personal watercraft which is susceptible of a low cost of manufacture with regard to both materials and labor, and which accordingly is then susceptible of low prices of sale to the consuming public, thereby making such a lighting system for a personal watercraft economically available to the buying public.

Even still another object of the present invention is to provide a new and improved lighting system for a personal watercraft for ensuring added visibility of the personal watercraft.

Lastly, it is an object of the present invention to provide a new and improved lighting system for a personal watercraft including a front light portion secured to a peripheral frame portion at a front portion of a personal watercraft. The front light portion is comprised of an elongated rod having a lower end extending through an aperture in the peripheral frame portion. An upper end of the elongated rod has a bulb disposed thereon. The front light portion is in communication with a battery of the personal watercraft. A rear light portion is secured to the peripheral frame portion at a rear portion of the personal watercraft. The rear light portion is comprised of an elongated rod having a lower end extending through an aperture in the peripheral frame portion. An upper end of the elongated rod has a bulb disposed thereon. The rear light portion is in communication with a battery of the personal watercraft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated prefer red embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
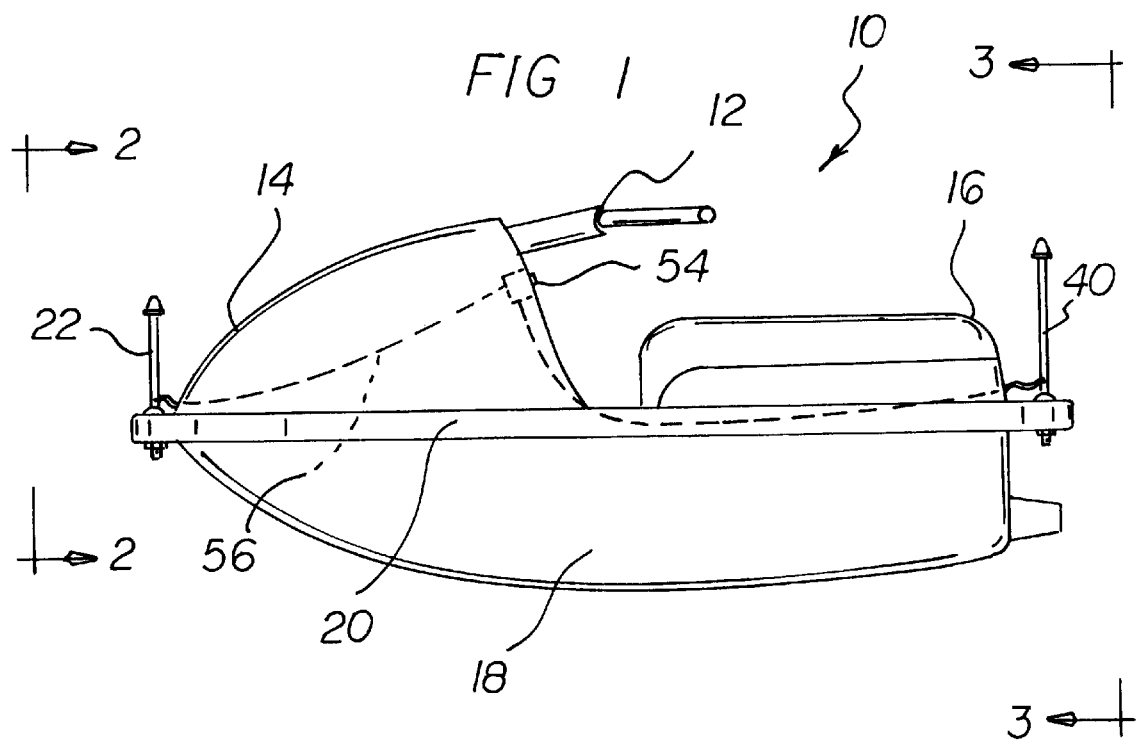
FIG. 1 is a side view of the preferred embodiment of the lighting system for a personal watercraft constructed in accordance with the principles of the present invention.
Figure 2:
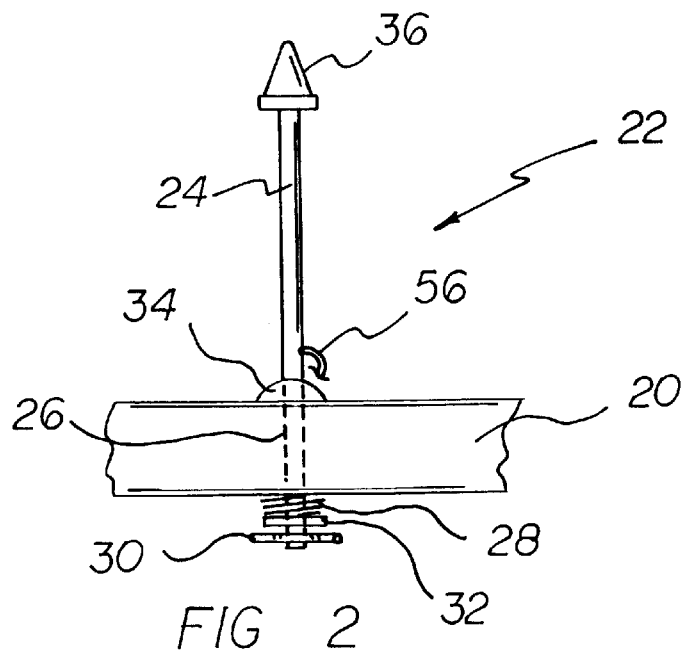
FIG. 2 is a front view of the present invention as taken along line 2—2 of FIG. 1.
Figure 3:
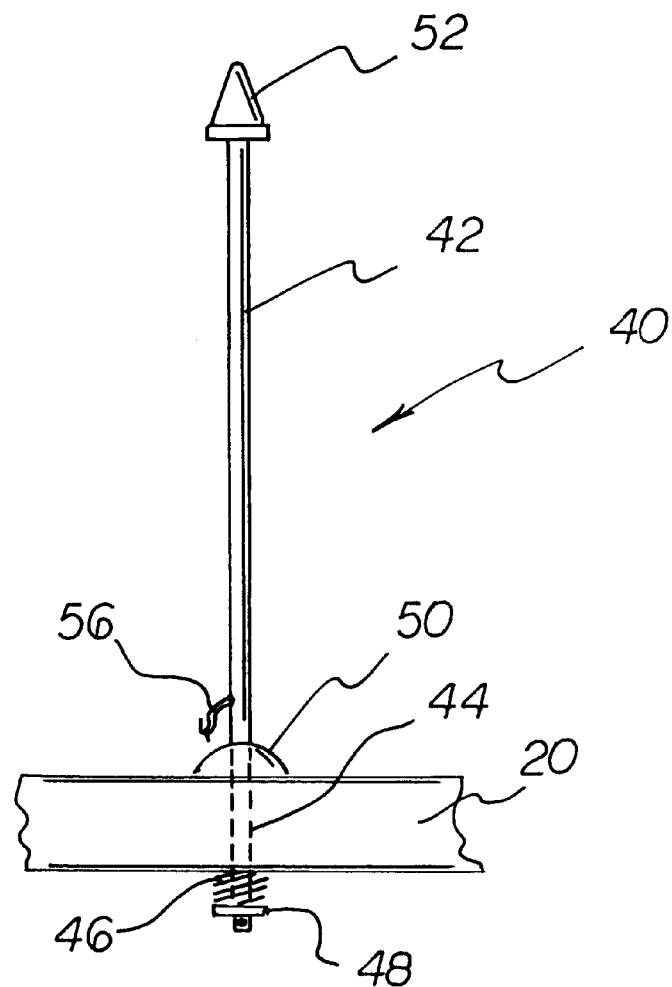
FIG. 3 is a rear view of the present invention as taken along line 3—3 of FIG. 1.
Figure 4:
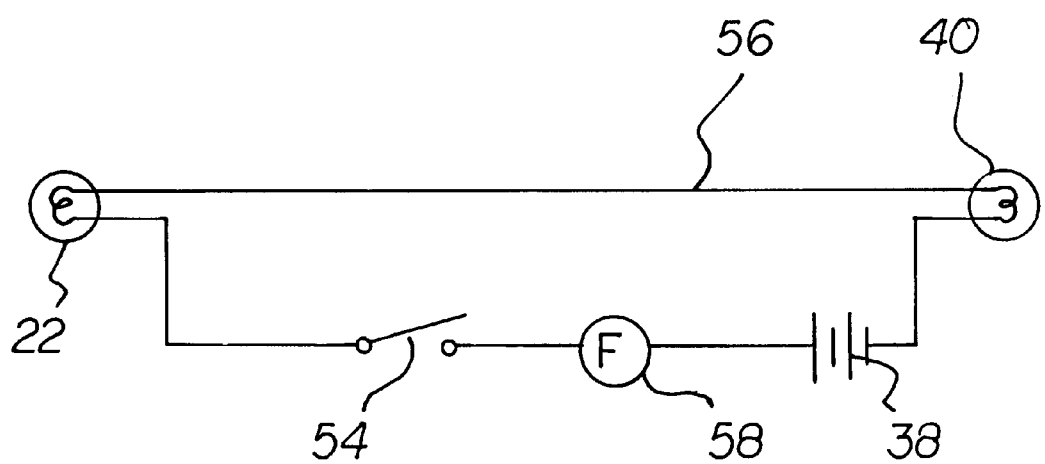
FIG. 4 is a schematic illustration of the present invention.

With reference now to the drawings, and in particular, to FIGS. 1 through 4 thereof, the preferred embodiment of the new and improved lighting system for a personal watercraft embodying the principles and concepts of the present invention and generally designated by the reference number 10 will be described.

Specifically, it will be noted in the various Figures that the device relates to a lighting system for a personal watercraft for insuring added visibility of the personal watercraft. In its broadest context, the device consists of a personal watercraft, a front light portion, a rear light portion, and a switch. Such components are individually configured and correlated with respect to each other so as to attain the desired objective.

The personal watercraft 12 is defined by a front portion 14, a rear portion 16, and intermediate portion 18 therebetween. The personal watercraft 12 has a peripheral frame portion 20 extending therearound.

The front light portion 22 is secured to the peripheral frame portion 20 at the front portion 14 of the personal watercraft 12. The front light portion 22 is comprised of an elongated rod 24 having a lower end extending through an aperture 26 in the peripheral frame portion 20. The lower end has a spring 28 disposed thereon positioned below the peripheral frame portion 20. The lower end has a fastening nut 30 and corresponding washer 32 disposed thereon. The elongated rod 24 has a washer 34 disposed thereon positioned above the peripheral frame portion 20. An upper end of the elongated rod 24 has a bulb 36 disposed thereon. The front light portion 22 is in communication with a battery 38 of the personal watercraft 12.

The rear light portion 40 is secured to the peripheral frame portion 20 at the rear portion 16 of the personal watercraft 12. The rear light portion 40 is comprised of an elongated rod 42 having a lower end extending through an aperture 44 in the peripheral frame portion 20. The lower end has a spring 46 disposed thereon positioned below the peripheral frame portion 20. The lower end has a fastening nut 48 disposed thereon. The elongated rod 42 has a washer 50 disposed thereon positioned above the peripheral frame portion 20. An upper end of the elongated rod 42 has a bulb 52 disposed thereon. The rear light portion 40 is in communication with the battery 38 of the personal watercraft 12.

The switch 54 is secured within a control panel of the personal watercraft 12. The switch 54 is in communication with the front and rear light portions 22,40. The switch 54 has wires 56 that lead to the front and rear light portions 22,40. The wires 56 are then coupled with the batter 38. Additionally, the switch 54 is provided with a replaceable fuse 58. The driver of the personal watercraft 12 can make their own determinations as to when they should activate the front and rear light portions 22,40 and then can simply do so by flipping the switch 54.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A lighting system for a personal watercraft for ensuring added visibility of the personal watercraft comprising, in combination:

a personal watercraft defined by a front portion, a rear portion, and a intermediate portion therebetween, the personal watercraft having a peripheral frame portion extending therearound;

a front light portion secured to the peripheral frame portion at the front portion of the personal watercraft, the front light portion being comprised of an elongated rod having a lower end extending through an aperture in the peripheral frame portion, the lower end having a spring disposed thereon positioned below the peripheral frame portion, the lower end having a fastening nut disposed thereon, the elongated rod having a washer disposed thereon positioned above the peripheral frame portion, an upper end of the elongated rod having a bulb disposed thereon, the front light portion being in communication with a battery of the personal watercraft;

a rear light portion secured to the peripheral frame portion at the rear portion of the personal watercraft, the rear light portion being comprised of an elongated rod having a lower end extending through an aperture in the peripheral frame portion, the lower end having a spring disposed thereon positioned below the peripheral frame portion, the lower end having a fastening nut disposed thereon, the elongated rod having a washer disposed thereon positioned above the peripheral frame portion, an upper end of the elongated rod having a bulb disposed thereon, the rear light portion being in communication with a battery of the personal watercraft;

a switch secured within a control panel of the personal watercraft, the switch being in communication with the front and rear light portions.

2. A lighting system for a personal watercraft for ensuring added visibility of the personal watercraft comprising, in combination:

a front light portion secured to a peripheral frame portion at a front portion of a personal watercraft, the front light portion being comprised of an elongated rod having a lower end extending through an aperture in the peripheral frame portion, an upper end of the elongated rod having a bulb disposed thereon, the front light portion being in communication with a battery of the personal watercraft;

a rear light portion secured to the peripheral frame portion at a rear portion of the personal watercraft, the rear light portion being comprised of an elongated rod having a lower end extending through an aperture in the peripheral frame portion, an upper end of the elongated rod having a bulb disposed thereon, the rear light portion being in communication with a battery of the personal watercraft.

3. The lighting system for a personal watercraft as set forth in claim 2 wherein the lower ends of the elongated rods of the front and rear light portions have a spring disposed thereon positioned below the peripheral frame portion, the lower end having a fastening nut disposed thereon.

4. The lighting system for a personal watercraft as set forth in claim 3 wherein the elongated rods each have a washer disposed thereon positioned above the peripheral frame portion.

5. The lighting system for a personal watercraft as set forth in claim 2 and further including a switch secured within a control panel of the personal watercraft, the switch being in communication with the front and rear light portions.

* * * * *